J. R. & D. W. PERRY.
Car Truck.

No. 77,520.

Patented May 5, 1868.

Witnesses
Theo Tesche
W. Trewin

Inventor
J. R. Perry
D. W. Perry
Per Munn & Co
Attorneys

United States Patent Office.

J. R. PERRY AND D. W. PERRY, OF WILKESBARRE, PENNSYLVANIA.

Letters Patent No. 77,520, dated May 5, 1868.

IMPROVED RAILROAD-CAR TRUCK.

*The Schedule referred to in these Letters Patent and making part of the same.*

TO ALL WHOM IT MAY CONCERN:

Be it known that we, J. R. PERRY and D. W. PERRY, of Wilkesbarre, in the county of Luzerne, and State of Pennsylvania, have invented a new and useful Improvement in Railroad-Cars; and we do hereby declare that the following is a full, clear, and exact description thereof, which will enable others skilled in the art to make and use the same, reference being had to the accompanying drawings, forming part of this specification.

This invention relates to a new and improved method of constructing the trucks and bodies of railroad-cars, whereby the friction and wear are greatly lessened, and they are rendered much less liable to accident, and much more convenient otherwise than those constructed in the ordinary manner.

And the invention consists, principally, in providing an axle for each wheel, and arranging it so that the wheels of the car can revolve independently of each other, and thereby adjust themselves to the curves of the track, as will be hereinafter more fully described.

Similar letters of reference indicate corresponding parts.

The main feature of this invention is arranging the wheels on separate axles, (to which axles they are rigidly attached,) and which axles revolve in adjustable boxes, and connecting them together in such a manner that the wheels may adjust themselves to the curves of the track, and revolve at different velocities, or independent of each other.

A represents the wheels, B the axles, C the outer boxes, and D the inner boxes of the axles.

Figure 1:
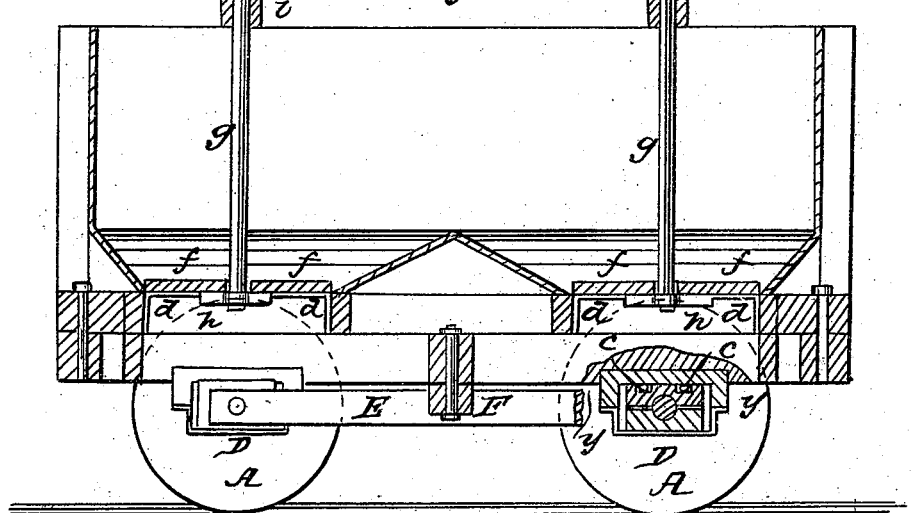
Figure 1 represents a vertical longitudinal section of a railroad-car, the section being through the line $x\ x$ of fig. 2.

The inner box of each wheel is allowed to move laterally, as seen in fig. 1.

Figure 2:
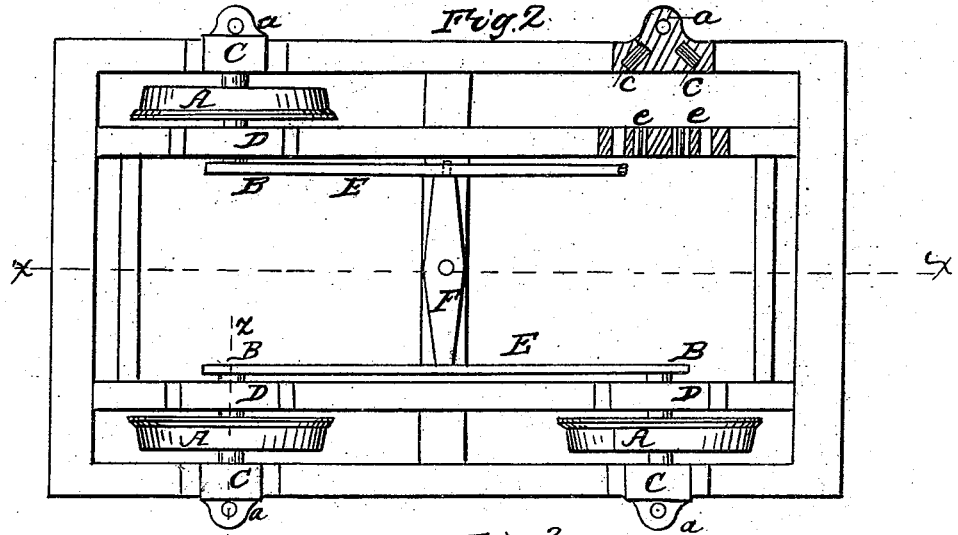
Figure 2 is a view of the car, partly in section, (as through the line $y\ y$ of fig. 1,) turned bottom side up, so as to show to better advantage the manner in which the axles move and are connected together.
Figure 3:
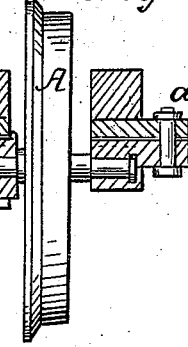
Figure 3 is a section of fig. 2, through the line $z\ z$.

The outer box is attached to the frame by a single pivot-bolt or cup-joint, as seen at $a$ in figs. 2 and 3, so that it will be seen that the axles and wheels can turn on the pivot $a$, and thereby adjust themselves to the curves of the road. As railroad-trucks are now constructed, the wheels are rigidly attached to the axles, and the axles revolve in boxes which are rigidly attached to the frame of the trucks.

In passing around a curve, wheels thus attached must move at different velocities, as they have different distances to travel in the same space of time. The result is that the axles are not unfrequently twisted off by the torsion or wringing-action to which they are thus exposed, as the wheel on the inner circle or rail must constantly slip on the track.

With wheels arranged according to our plan, this difficulty is not met with.

The axles are connected together by the rods E E, as seen in the drawing, and the rods are connected at the middle of the truck by the oscillating-bar F, which is pivoted to the frame. In this manner the axles move uniformly, and the wheels adjust themselves to the track around a curve with the same precision that they do at other times.

In order to give the wheel and axle a free motion, and allow them to turn with as little friction as possible, there are friction-rolls, placed so that the weight bears upon them, as seen in the drawing. These rolls are marked $c$.

By this arrangement the car is much less liable to run off the track, and the additional journals serve not only to equalize the weight upon the different wheels, but to greatly increase the strength and durability of the cars by taking the strain away from the car-frame.

Having thus described our invention, what we claim as new, and desire to secure by Letters Patent, is—

The combination of the sliding and pivoted boxes C D, upon each side of the wheels, friction-rollers $e$, connecting-bar E, attached to the axles upon each side of the car, and the oscillating-bar F, as herein described for the purpose specified.

J. R. PERRY,
D. W. PERRY.

Witnesses:
   JOHN C. FREDERICK,
   REUBEN T. HOPKINS.